(12) United States Patent
Hall et al.

(10) Patent No.: US 6,512,644 B1
(45) Date of Patent: Jan. 28, 2003

(54) METHOD AND APPARATUS FOR READ-AFTER-WRITE VERIFICATION WITH ERROR TOLERANCE

(75) Inventors: Dana Hall, Hopkinton, MA (US); Arnon Friedmann, Marlborough, MA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/576,735

(22) Filed: May 23, 2000

(51) Int. Cl.[7] ............................. G11B 27/36; G11B 5/09

(52) U.S. Cl. ......................................... 360/31; 360/53

(58) Field of Search ....................... 360/31, 53; 369/53, 369/36, 35, 33; 714/762, 761, 774, 770, 769, 704

(56) References Cited

U.S. PATENT DOCUMENTS

| 5,408,366 A | * | 4/1995 | Bentley et al. ............... 360/53 |
| 5,594,599 A | * | 1/1997 | Ueda ........................... 360/53 |
| 6,141,164 A | * | 10/2000 | Ishibashi et al. .............. 360/53 |

* cited by examiner

Primary Examiner—Alan T. Faber
(74) Attorney, Agent, or Firm—Morrison & Foerster LLP

(57) ABSTRACT

A method and apparatus for Read-After-Write (RAW) verification with error tolerance is disclosed whereby upon read back of data from a medium, the actual read data can be compared to the actual write data, and the number of miscompares between the two can be counted. The severity of the number of miscompares can be determined depending on the Error Control Code (ECC) system used. If the error is correctable by the ECC system, the block need not be re-written to the medium. The invention provides the ability to increase medium capacity and throughput over previous implementations.

21 Claims, 7 Drawing Sheets

METHOD AND APPARATUS FOR READ-AFTER-WRITE VERIFICATION WITH ERROR TOLERANCE

BACKGROUND OF THE INVENTION

1. Field of the Invention

Aspects of the invention relate to certain methods and apparatuses by which data is written to a medium.

2. Description of Related Art and General Background

Certain memory devices, e.g., tape drives perform read-after-write verification in order to guarantee that the data written to the medium can be recovered sometime in the future upon read back. During the write process, the written data is read back, and the read back data is checked to insure that the data was written correctly and that it can be recovered at a later time. The data check typically consists of calculating an Error Detection Code (EDC) on the read data and comparing the result with the value written onto the medium. A write error is declared when the EDC written on the medium does not match the calculated EDC. If a write error is declared, the suspect data is typically rewritten on the medium. Most EDCs simply detect whether an error occurred, not the severity of the error. Thus a single bit in error can cause data blocks to be re-written.

U.S. Pat. No. 5,594,599 discloses an apparatus that verifies proper operation of a recording and reproducing apparatus by comparing, after a suitable delay, EDCs calculated for compressed data prior to being recorded on a medium. The apparatus uses EDCs calculated for the corresponding compressed data reproduced from the medium, and thereby reduces the amount of:delay memory needed to temporarily store the error detection codes calculated prior to recording of the data. The apparatus, however, does not provide a mechanism whereby the actual read data is compared to the actual write data to detect a severity of the error.

Current digital, linear tape/super digital linear tape (DLT/SDLT) Read-After-Write (RAW) strategies use a 64 bit physical block cyclic redundancy check (CRC64) as the criteria for whether a block has been successfully written to a medium. If the CRC64 read from the medium does not match the value computed from the read data, then the block is deemed to be in error on the medium and should be rewritten. The CRC64 is capable of detecting read back errors, but cannot determine the severity of the error. The current RAW strategy requires that any block written which has a RAW CRC error should be rewritten onto the medium.

For next generation products, aggressive improvements in track width, track pitch, bit density and reduced signal-to-noise ratio (SNR) appear to show that the current RAW strategy will be inefficient and ineffective. Measured channel error statistics have shown that if the current RAW strategy is maintained, then the amount of rewrites will increase dramatically, impacting media capacity and data rate. Thus a new RAW strategy is needed.

SUMMARY OF THE INVENTION

An embodiment of the present invention receives a bit stream of information from memory, and saves the information in a storage area. The information is then written to a medium, after which it is read from the medium and compared to the information saved in the storage area. A number of miscompares is counted between the information read from the medium and the information saved in the storage area, and the information is rewritten to the medium when more than a predetermined amount of miscompares has occurred.

BRIEF DESCRIPTION OF THE DRAWINGS

The invention is described with reference to the following drawings in which.

DETAILED DESCRIPTION OF THE INVENTION

The medium error correction code (ECC) scheme of an embodiment of the present invention was developed when the predominate error mechanism was due to large dropouts due to media defects, scratches, etc. Measurements have shown that small error bursts are becoming a larger percentage of the error event population, and the current block ECC is not effective or efficient in this very short, bursty, error environment. To combat the short bursty error events, another layer of ECC has been proposed that provides ECC protection on each physical block or subblock. This has been referred to as Inline ECC (ILECC) or Column ECC. This ECC is designed to be compatible with the 32-bit modulation code read from the medium and its burst statistics, to correct most small burst type errors observed in the lab. The proposed codes are guaranteed to correct up to a certain number, x, of burst errors having up to a certain number, y, of bits.

The RAW strategy is based upon the premise that it is ok to write blocks to a medium and allow a certain number of data bits to be in error upon read back. When the number of bits or symbols in error is less than the correction capability of the ILECC, it is ok to not rewrite the block, because it can be recovered upon read back by invoking ILECC correction. The new RAW strategy will actually compare the data written to tape, with the data read back from tape and count the number of symbols in error. For counts greater than a programmable threshold, the block will be flagged as a potential candidate for being rewritten to the medium.

Figure 1:
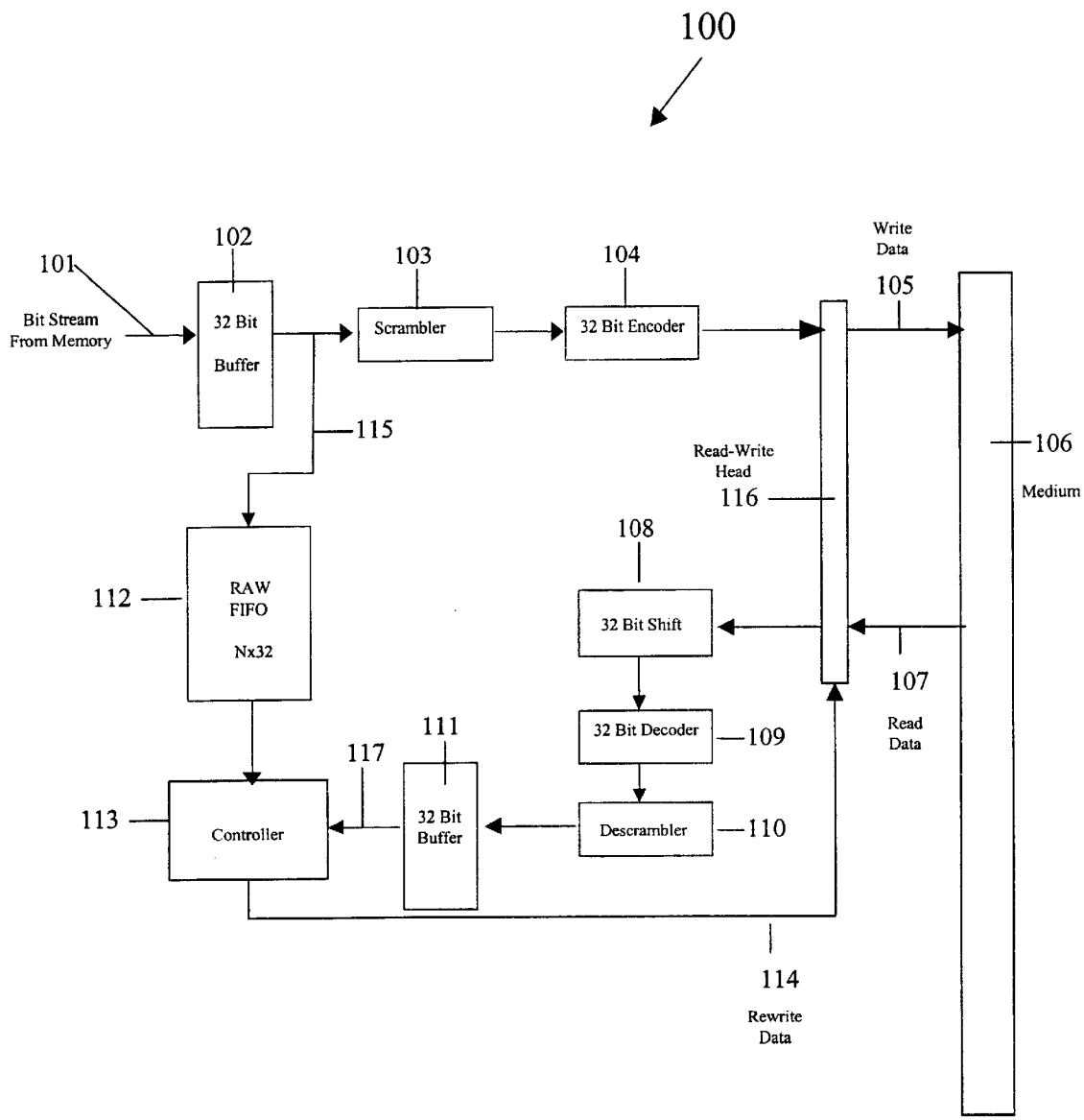
FIG. 1 is an illustration of the RAW architecture of the present invention.
Figure 2:
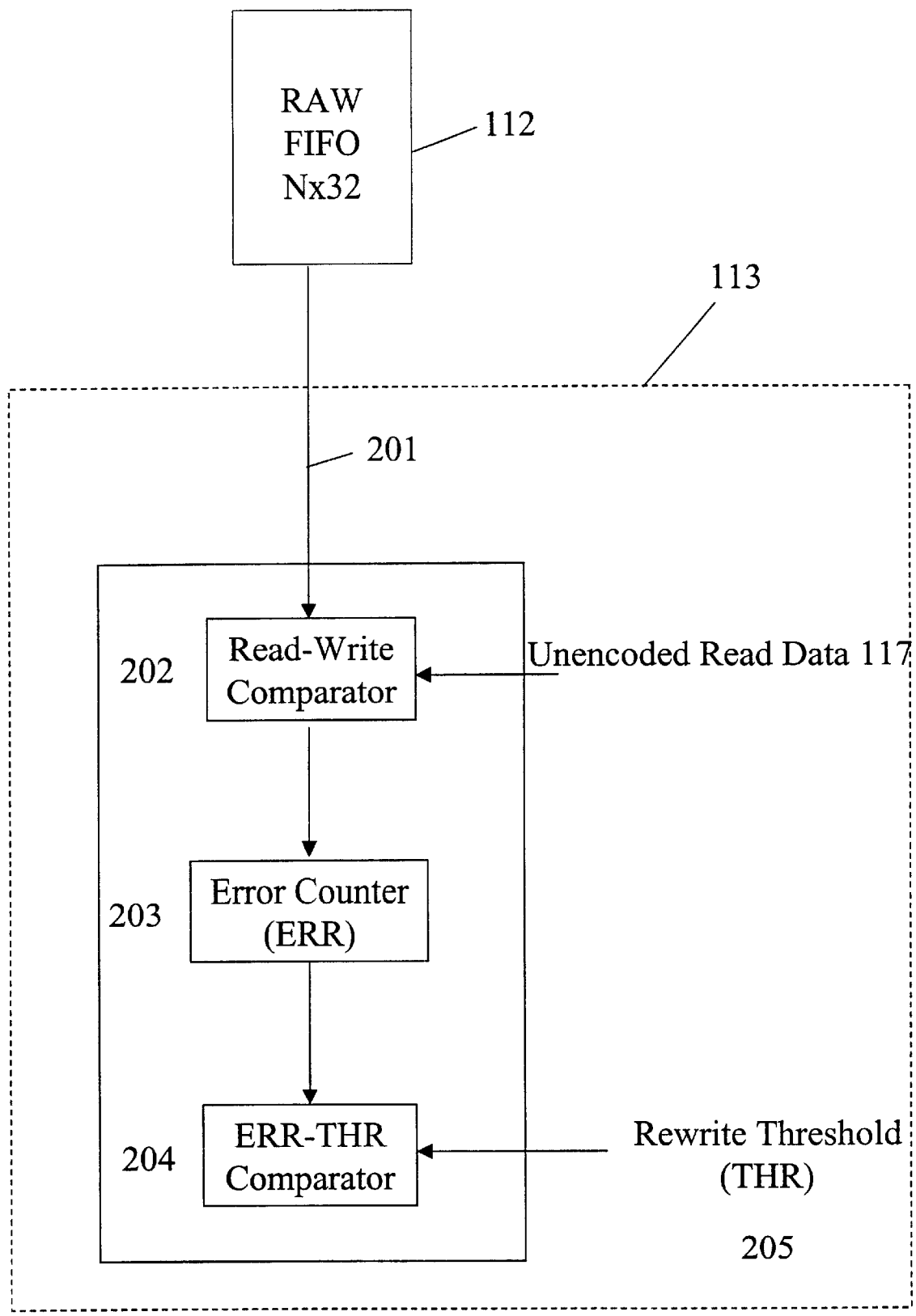
FIG. 2 illustrates a first embodiment of the controller of FIG. 1.

As shown in FIG. 1, an embodiment of the proposed RAW architecture 100 stores write data 105 in a RAW first-in first-out (FIFO) 112, prior to being scrambled by a scrambler 103, encoded by a 32-bit encoder 104, and written to a medium 106 by a read-write head 116. The unencoded write data 115 is saved into the RAW FIFO 112 in 32-bit increments and becomes FIFO data 201 (as shown in FIG. 2). Read data 107 is read from the medium 106 by the read-write head 116 into a 32-bit shift register 108, decoded with a 32-bit decoder 109, descrambled with a descrambler 110, and stored in a 32-bit buffer 111 prior to being passed to a controller 113. Some examples of the medium 106 may include, but are not limited to, a digitally readable tape, CD-R/W, hard disk, floppy disk, or any other medium to which data may be written and read. The read data 107 and write data 105 may also be referred to as ECC symbols that may have any number of bits. The FIFO data 201 is read from the FIFO 112 upon receiving a 32-bit word from the decoded read data 117 and is passed to the controller. 113.

FIG. 2 illustrates a first embodiment of the controller 113 of FIG. 1. The controller 113 contains a read-write comparator 202, an error counter (ERR) 203, and an ERR-THR comparator 204. The read-write comparator 202 receives data 201 from the RAW FIFO 112 and data 117 decoded and stored in the 32-bit buffer 111, and the ERR-THR comparator receives a programmable rewrite threshold (THR) 205.

Figure 3:
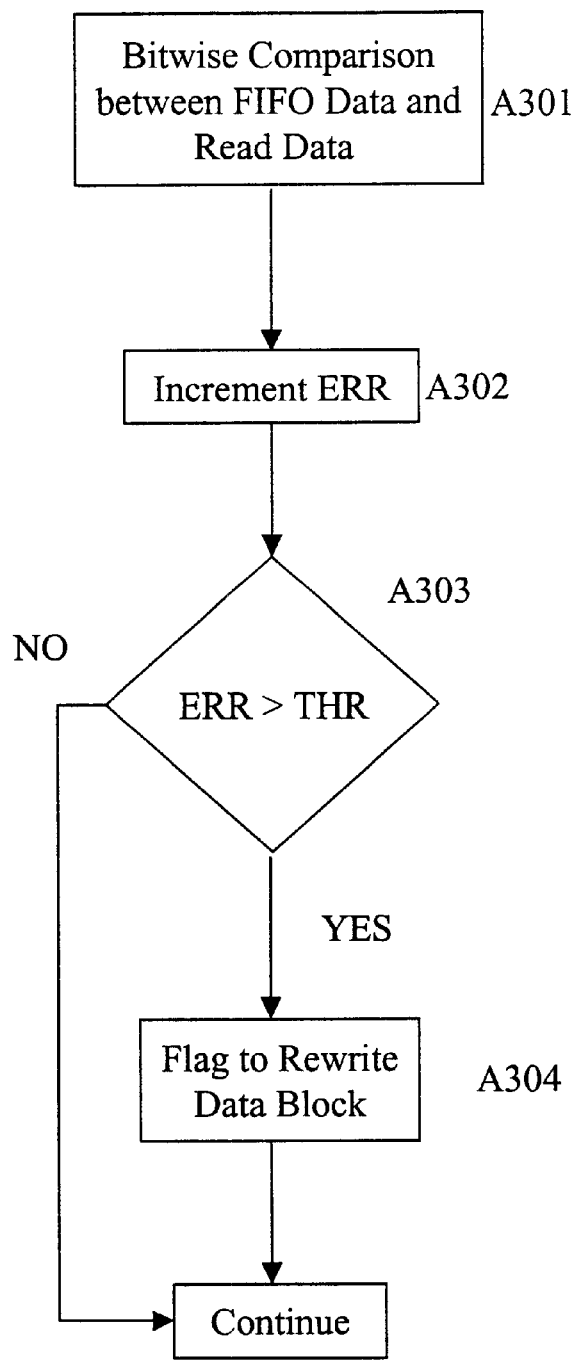
FIG. 3 illustrates a first embodiment of the method of the controller of FIG. 2.

FIG. 3 illustrates a first embodiment of the method of the controller 113 of FIG. 2 and shows a bitwise comparison A301 between the FIFO data 201 and the decoded read data 117. For each error detected between the FIFO data 201 and the decoded read data 117 from the 32-bit buffer 111, the ERR 203 is incremented at A302. The ERR data is then passed to the ERR-THR comparator 204 to determine, according to the ECC system used, whether the number of errors detected is greater than THR 205 at A303. If the THR 205 is exceeded, the decoded read data 117 is flagged at A304 for rewriting further down on the medium 106. Otherwise, the number of detected errors is within the scope of correction by the ECC system and need not be rewritten to the medium 106.

The criteria for declaring whether a block should be rewritten is dependent upon the capability of the ECC system used within the device for writing to the medium (e.g., a tape drive). Most ECC systems create codewords that are composed of a number of ECC symbols. Symbols can be defined as being binary, 1 bit/symbol, or non-binary, N bits/symbol, where N may be any number of bits. For a given symbol size, some examples of possible ECC systems are as follows:

(1) ECC System Designed for Random Error Statistics

Figure 4:
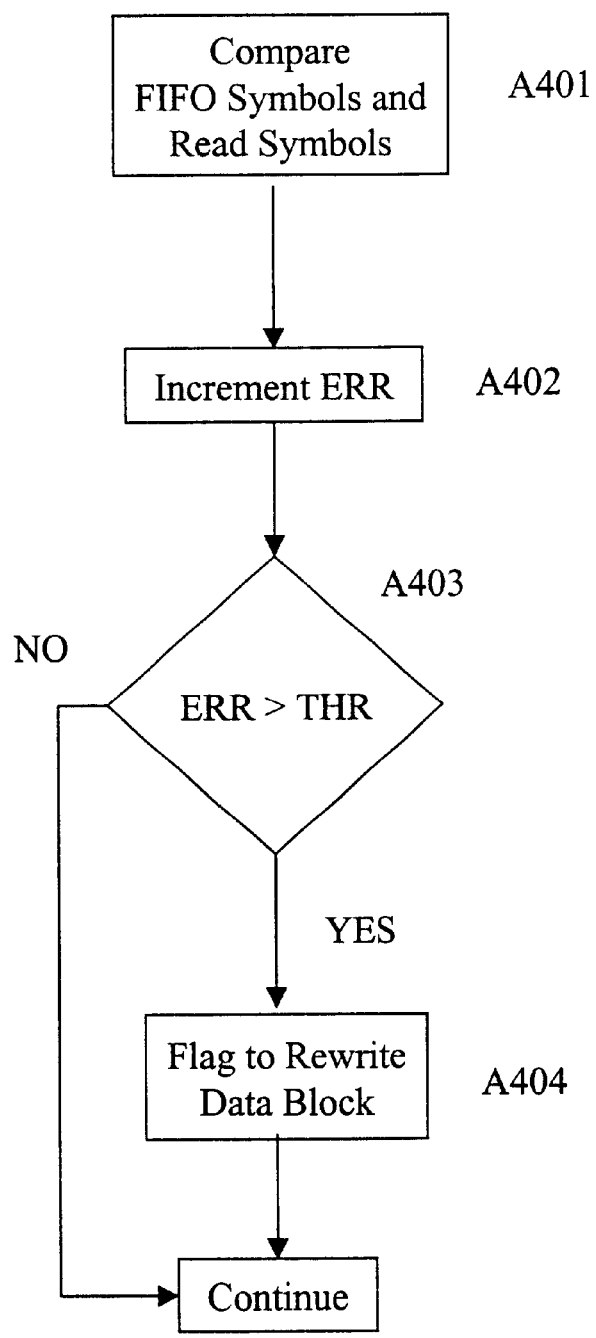
FIG. 4 illustrates a second embodiment of the method of the controller of FIG. 2.

FIG. 4 illustrates a second embodiment of the method of the controller 113 of FIG. 2 and shows a comparison A401 between the symbols read from the RAW FIFO 112 and the symbols read from the 32-bit buffer 111. A bitwise comparison occurs between the FIFO symbols and the read symbols, and the ERR 203 is incremented at A402 for each set of symbols that are not identical. The ERR data is then passed to the ERR-THR comparator 204 to determine, according to the ECC system used, whether the number of non-identical symbols are greater than a programmable threshold (THR) 205 at A403. If the THR 205 is exceeded, the read symbols are flagged at A404 for rewriting further down on the medium 106. Otherwise, the number of non-identical symbols are within the scope of correction by the ECC system and need not be rewritten to the medium 106.

(2) ECC System Designed for Burst Error Statistics

A system that exhibits burst errors is characterized by the fact that if an error occurs in the data stream upon read back from a medium, then data bits that are in close proximity to the error have a high probability of also being in error. These erroneous data bits tend to cluster in bursts.

Figure 5:
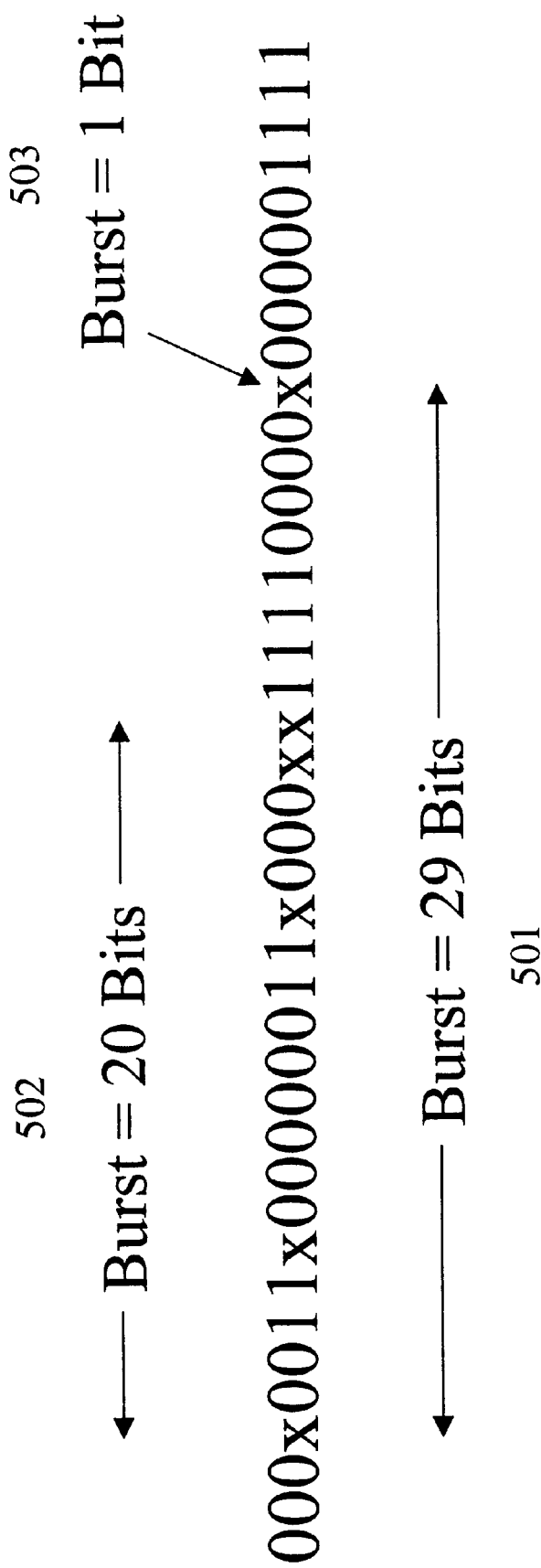
FIG. 5 illustrates an exemplary embodiment of error burst data.

In a system exhibiting burst errors, intervening bits may be good or bad. For example, FIG. 5 shows: a sequence of data bits having errors, where x denotes a bit error. The burst lengths and number of bursts are determined according to the ECC system used and can be viewed in a number of ways. For example, the burst errors shown in FIG. 5 can be viewed as:

1. 1 burst having a length of 29 bits (501);
2. 2 bursts: 1 burst of 20 bits (502) and a second burst of 1 bit (503); or
3. Other combinations constructed from FIG. 5 having different numbers of total burst data bits.

Figure 6:
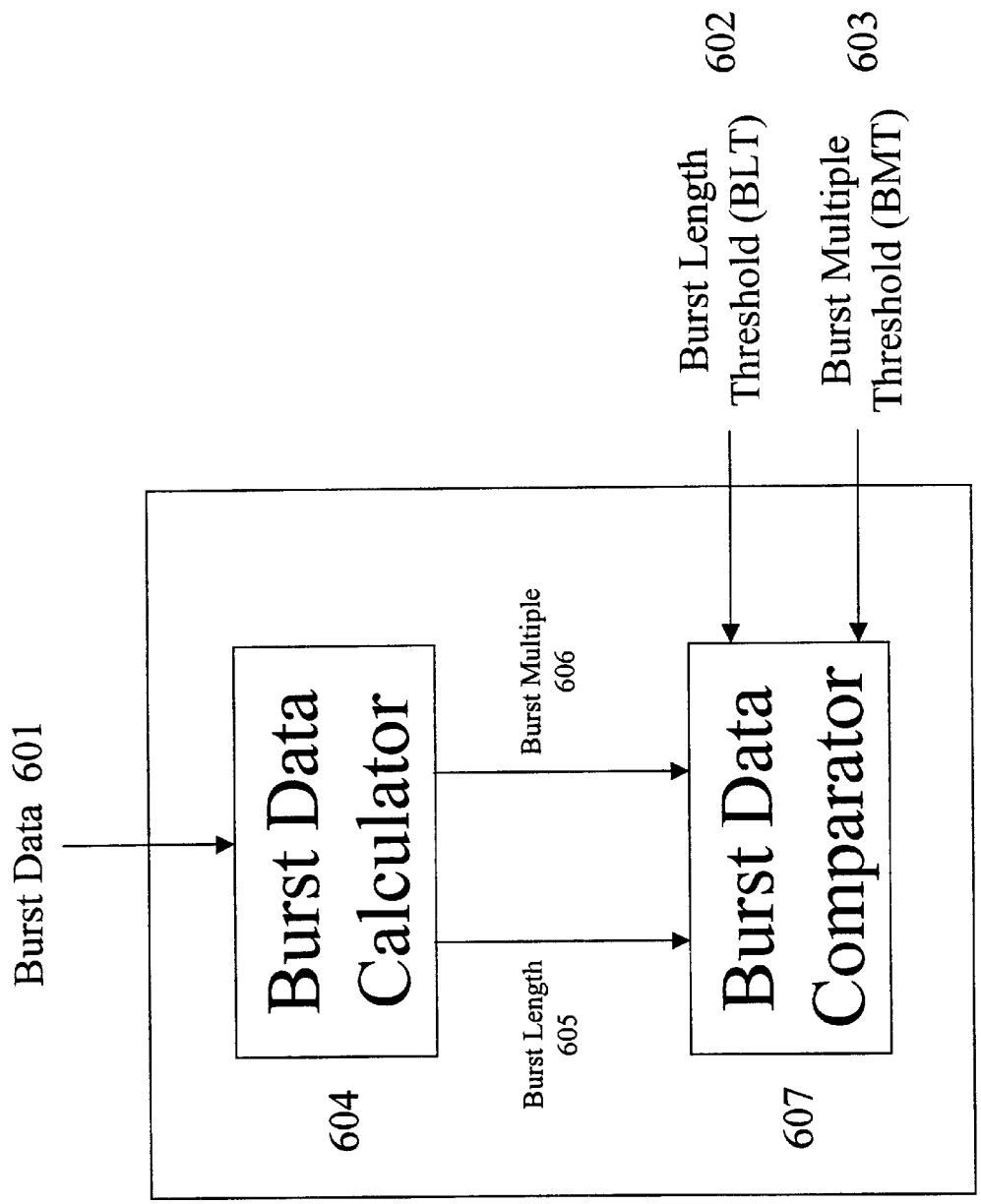
FIG. 6 illustrates a second embodiment of the controller of FIG. 1.

FIG. 6 illustrates a second embodiment of the controller 113 of FIG. 1. The controller 113 contains a burst data calculator 604 and a burst data comparator 607. The burst data calculator 604 receives burst data 601 read from the medium 106 and calculates, according to the ECC system used, the length of the burst error data (burst length) 605 and the number of multiple smaller data bursts (burst multiple) 606 that may have occurred. Depending on the ECC system used, the burst length 605 may comprise a single error data burst length or the sum total of the multiple smaller data bursts. The burst data comparator 607 receives the burst length 605, burst multiple, 606, a programmable burst length threshold (BLT) 602, and a burst multiple threshold (BMT) 603.

Figure 7:
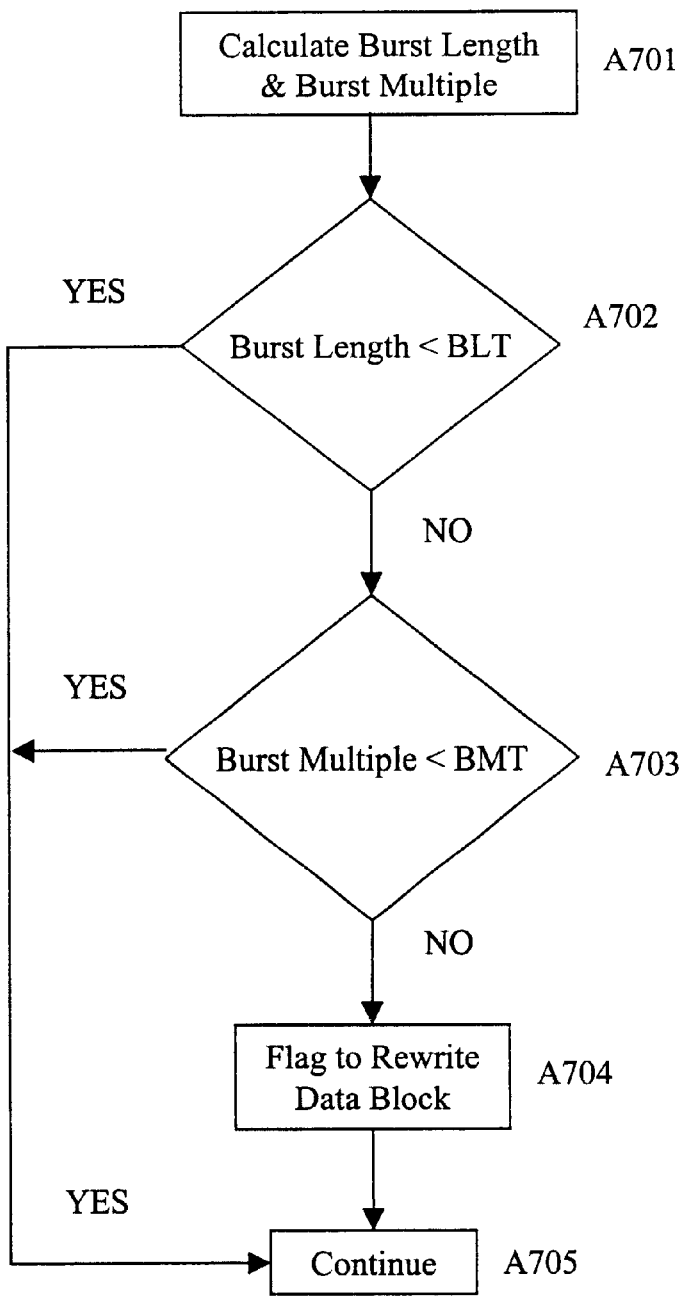
FIG. 7 illustrates a first embodiment of the method of the controller of FIG. 6.

Most burst ECC codes are capable of correcting a single data burst of a maximum symbol size or multiple smaller bursts of a certain size. FIG. 7 illustrates an embodiment of the method of the controller of FIG. 6 and the method of calculation of the burst length 605 and the burst multiple 606. At A701, the burst length and number of bursts, or burst multiples, is calculated. The exact method for performing the calculation depends on the ECC code used and is well known in the art. A programmable maximum burst length threshold (BLT) is compared to the burst length 605 at A702, and a programmable burst multiple threshold (BMT) is compared to the burst multiple 606 at A703. If the thresholds are exceeded, then the read data 107 is flagged at A704 for rewriting further down on the medium 106. Otherwise, the number and length of the error bursts are within the scope of correction by the ECC system and need not be rewritten to the medium 106.

While the invention has been described by way of example embodiments, it is understood that the words that have been used herein are words of descriptions, rather than words of limitation. Changes may be made, within the purview of the appended claims, without departing from the scope and spirit of the invention in its broader aspects. Although the invention has been described herein with reference to particular structures, materials, and embodiments, it is understood that the invention is not limited to the particulars disclosed. The invention extends to all equivalent structures, mechanisms, acts, and uses, such as are within the scope of the appended claims.

We claim:

1. A method comprising:
   receiving a bit stream of information;
   saving the information in a storage area;
   writing the information to a medium;
   reading the information from the medium;
   comparing the information read from the medium to the information saved in the storage area;
   counting miscompares between the information read from the medium and the information saved in the storage area, wherein the counting comprises counting burst lengths and a number of bursts; and
   rewriting the information to the medium in response to a number of miscompares exceeding a threshold.

2. The method of claim 1, wherein the medium comprises one of a digitally readable tape, CD-R/W, hard disk, and floppy disk.

3. The method of claim 1, wherein the comparing comprises detecting a number of miscompares via a bitwise comparison of the information in the storage area against the information read from the medium.

4. The method of claim 3, wherein the counting comprises incrementing a counter for each miscompare detected via the bitwise comparison.

5. The method of claim 1, wherein the threshold comprises a burst length threshold and a burst multiple threshold.

6. The method of claim 5, wherein the rewriting comprises rewriting the information to the medium if at least one of the burst length threshold and burst multiple threshold is exceeded.

7. An apparatus for reading and writing to a medium, the apparatus comprising:
a controller to control a writing of information to the medium;
a writing mechanism to write the information to the medium;
a reading mechanism to read the information from the medium into the controller;
a storage area to store the information to be written to the medium;
the controller comprising:
a first comparator to compare the information in the storage area with the information read from the medium by the reading mechanism;
a counter to count a number of miscompares between the information in the storage area and the information read by the reading mechanism; and
a second comparator to determine whether the number of miscompares counted by the counter is greater than a threshold; and
the writing mechanism rewrites the information to the medium in response to the second comparator determining that the number of miscompares is greater than the threshold, wherein the threshold comprises a burst length threshold and a burst multiple threshold.

8. The apparatus of claim 7, wherein the medium comprises one of a digitally readable tape, CD-R/W, hard disk, and floppy disk.

9. The apparatus of claim 7, wherein the first comparator detects the number of miscompares via a bitwise comparison of the information from the storage area against the information read from the medium.

10. The apparatus of claim 7, further comprising rewriting the information to the medium if the comparing determines that at least one of the burst length threshold and burst multiple threshold is exceeded.

11. A machine-readable medium comprising machine-readable information recorded thereon, such that when the machine-readable information is read by a machine for reading and writing to a second medium, the machine is caused to:
receive a bit stream of information;
save the information in a storage area;
write the information to the second medium;
read the information from the second medium;
compare the information read from the second medium to the information saved in the storage area;
count miscompares between the information read from the second medium and the information saved in the storage area; and
rewrite the information to the second medium in response to a number of miscompares exceeding a threshold, wherein the threshold further comprises a burst length threshold and a burst multiple threshold.

12. The machine-readable medium of claim 11, wherein the second medium comprises one of a digitally readable tape, CD-R/W, hard disk, and floppy disk.

13. The machine-readable medium of claim 11, wherein the machine compares the information, the machine is further caused to detect a number of miscompares via a bitwise comparison of the information read from the storage area against the information read from the second medium.

14. The machine-readable medium of claim 11, wherein the information is rewritten to the medium when at least one of the burst length threshold and burst multiple threshold is exceeded.

15. A method comprising:
receiving a bit stream of information;
saving the information in a storage area;
writing the information to a medium;
reading the information from the medium;
comparing via a bitwise comparison the information read from the medium to the information saved in the storage area;
counting miscompares between the information read from the medium and the information saved in the storage area; and
rewriting the information to the medium in response to a number of miscompares exceeding a threshold.

16. The method of claim 15, wherein the medium comprises one of a digitally readable tape, CD-R/W, hard disk, and floppy disk.

17. The method of claim 15, wherein the counting comprises incrementing a counter for each miscompare detected via the bitwise comparison.

18. An apparatus for reading and writing to a medium, the apparatus comprising:
a controller to control a writing of information to the medium;
a writing mechanism to write the information to the medium;
a reading mechanism to read the information from the medium into the controller;
a storage area to store the information to be written to the medium;
the controller comprising:
a first comparator to compare via a bitwise comparison the information in the storage area with the information read from the medium by the reading mechanism;
a counter to count a number of miscompares between the information in the storage area and the information read by the reading mechanism; and
a second comparator to determine whether the number of miscompares counted by the counter is greater than a threshold; and
the writing mechanism rewrites the information to the medium in response to the second comparator determining that the number of miscompares is greater than the threshold.

19. The apparatus of claim 18, wherein the medium comprises one of a digitally readable tape, CD-R/W, hard disk, and floppy disk.

20. A machine-readable medium comprising machine-readable information recorded thereon, such that when the machine-readable information is read by a machine for reading and writing to a second medium, the machine is caused to:
receive a bit stream of information;
save the information in a storage area;
write the information to the second medium;
read the information from the second medium;
compare via a bitwise comparison the information read from the second medium to the information saved in the storage area;

count miscompares between the information read from the second medium and the information saved in the storage area; and rewrite the information to the second medium in response to a number of miscompares exceeding a threshold.

21. The machine-readable medium of claim 20, wherein the second medium comprises one of a digitally readable tape, CD-R/W, hard disk, and floppy disk.

* * * * *